United States Patent [19]
Shin et al.

[11] Patent Number: 5,747,787
[45] Date of Patent: May 5, 1998

[54] DATA SYMBOL READING DEVICE

[75] Inventors: Takeharu Shin; Shuzo Seo; Nobuhiro Tani; Makoto Nukui; Yukihiro Ishizuka, all of Tokyo, Japan

[73] Assignee: Asashi Kogaku Kogyo Kabushiki Kaisha, Tokyo, Japan

[21] Appl. No.: 631,107

[22] Filed: Apr. 12, 1996

[30] Foreign Application Priority Data

May 17, 1995 [JP] Japan .................. 7-144117

[51] Int. Cl.⁶ .................................. G06K 7/10
[52] U.S. Cl. ............................ 235/472; 235/385
[58] Field of Search ..................... 235/462, 472, 235/385

[56] References Cited

U.S. PATENT DOCUMENTS

| | | |
|---|---|---|
| 4,180,204 | 12/1979 | Koenig et al. ............ 235/385 |
| 4,377,741 | 3/1983 | Brekka et al. ............ 235/472 |
| 4,514,815 | 4/1985 | Anderson ............. 364/478.03 |
| 4,949,104 | 8/1990 | Negoro et al. . |
| 4,963,941 | 10/1990 | Negishi et al. . |
| 5,063,416 | 11/1991 | Honda et al. . |
| 5,077,576 | 12/1991 | Stansfield et al. . |
| 5,138,465 | 8/1992 | Ng et al. . |
| 5,194,903 | 3/1993 | Negishi et al. . |
| 5,403,398 | 4/1995 | Riess et al. ............ 118/681 |
| 5,428,212 | 6/1995 | Tani et al. . |
| 5,448,046 | 9/1995 | Swartz ............. 235/432 |
| 5,450,164 | 9/1995 | Negishi et al. . |
| 5,457,307 | 10/1995 | Dumont ............ 235/383 |
| 5,602,377 | 2/1997 | Beller et al. ............ 235/462 |

*Primary Examiner*—Donald T. Hajec
*Assistant Examiner*—Mark Tremblay
*Attorney, Agent, or Firm*—Greenblum & Bernstein P.L.C.

[57] ABSTRACT

A data symbol reading device for decoding a data symbol is provided with a reading head which has an opening for contacting a symbol reading surface on which the data symbol is positioned. The reading head also includes an optical system for forming an image of the data symbol on an imaging device. The imaging device outputs the image to a processing device which determines that the data symbol is read properly. The data symbol reading device further includes a printing device for printing a predetermined code on the data symbol in response to the processing device determining that the data has been properly read. The data reading device further includes a print mode selection system which selects one of a plurality of printing modes. The printing device prints none or at least one of the predetermined codes in response to the printing mode selected by the print mode selection system.

14 Claims, 5 Drawing Sheets

DATA SYMBOL READING DEVICE

BACKGROUND OF THE INVENTION

The present invention relates to a data symbol reading device for reading an encoded data symbol such as a two dimensional data symbol.

Recently, data symbol reading devices which can read a two dimensional tessellated data symbol affixed to a product, have been developed for use at a point of sale terminal. The data symbol reading device uses an area sensor type of imaging device such as a CCD. The CCD can read the entire pattern of the two dimensional data symbol without being moved with respect to the data symbol, and therefore the data symbol can be read quickly.

However, in the above described data symbol reading device, it is difficult to know whether the data symbol which is to be read has already been read. Therefore, it is possible that the data symbol is undesirably repeatedly read. Further, some of the data symbols may not be read. Thus, if there are many data symbols to be read, then the operator must take extra precautions to ensure that none of the symbols are read more than once, and that each of the symbols is read. This increases the time required to read the data and decreases the efficiency of the data reading process.

SUMMARY OF THE INVENTION

It is therefore an object of the present invention to provide a data symbol reading device which is capable of indicating the data symbols which have been read from the data symbols which have not been read.

According to a first aspect of the present invention, there is provided a data symbol reading device which has a reading head. The reading head has an opening which contacts a symbol reading surface on which a data symbol is positioned. The reading head also includes an optical system for forming an image of the data symbol on an imaging device. The imaging device outputs the image to a processing device which determines that the data symbol is read properly. The data symbol reading device further includes a printing device for printing a predetermined code on the data symbol in response to the processing device determining that the data has been properly read.

Therefore, an operator of the data symbol reading device can quickly determine by looking at each product having a data symbol whether the data symbol was properly read, or whether the data symbol must be read again. This improves the overall efficiency of the data symbol reading device.

In the preferred embodiment, the printing device is provided near the opening of the reading head. Further, the printing device includes a printing head and the predetermined code includes character data and numerical data. Furthermore, a printing surface of the printing head contacts the symbol reading surface when the opening of the data symbol reading device contacts the symbol reading surface. Therefore, the printing of the predetermined code is performed immediately after the data symbol has been decoded by controlling a driving of the print head at the time that the symbol is properly read.

Optionally, the data symbol reading device includes a print mode selection device for selecting one of a plurality of printing modes. Further, the predetermined code printed by the print head is determined in response to the printing mode selected by the print mode selection device.

In at least one of the printing modes, the print head prints a first predetermined code in response to the processing device determining that the data symbol is read properly, and the print head prints a second predetermined code in response to the processing device determining that the data symbol is not read properly.

Alternatively, the print head prints nothing in response to the processing device determining that the data symbol is not read properly.

In another print mode, the print head prints a time of reading the data in response to the processing device determining that the data symbol is read properly, and the print head prints a predetermined code in response to the processing device determining that the data symbol is not read properly.

Preferably, the data symbol reading device includes a handle and the reading head is substantially L-shaped. The handle is attached to the reading head at one end and the opening is formed at another end of the reading head.

In the preferred embodiment, data symbol is a two dimensional binary symbol, such as a tessellated pattern.

According to a second aspect of the present invention, a data symbol reading device is provided which includes a device or illuminating a data symbol, a device for forming an image of the illuminated data symbol, a device for detecting the image of the illuminated data symbol, a device for decoding the detected image of the illuminated data symbol which outputs decode data, a device for determining that the data symbol has been properly decoded, and a device for printing predetermined data on the data symbol in response to the determining device determining that the data symbol has been properly decoded.

According to a third aspect of the present invention there is provided a data symbol reading device which includes a reading device for reading a data symbol affixed to a symbol reading surface of a product and a printing device for printing at least one predetermined code on the symbol reading surface near said data symbol in response to the reading of the data symbol.

In the preferred embodiment, the reading device includes a light receiving box which has an outside surface that contacts the symbol reading surface when the reading device reads the data symbol. Further, the printing device has a printing surface which lies on a plane that is coincident with a plane of the outside surface of the light receiving box.

DESCRIPTION OF THE EMBODIMENTS

Figure 1:
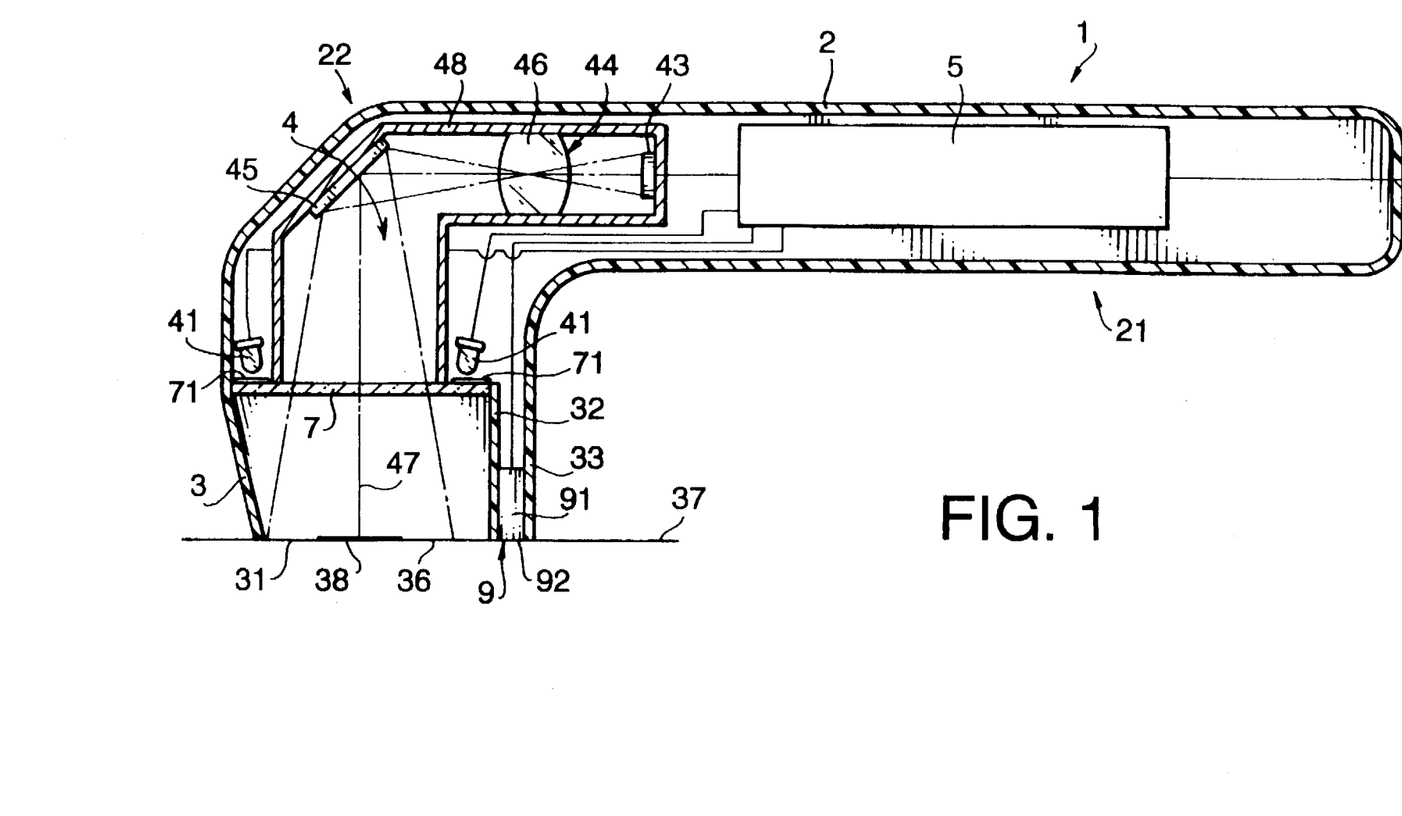
FIG. 1 shows a sectional side view of a data symbol reading device which embodies the present invention.

FIG. 1 shows a sectional side view of a data symbol reading device 1 according to an embodiment of the present invention.

As shown in FIG. 1, the data symbol reading device 1 has an outside case 2, which has a handle portion 21 and a reading head portion 22. The reading head portion 22 is substantially L-shaped and is contained within the front end of the case 2. The handle portion 21 is located at a rear side of the reading head portion 22, and contains a signal processing circuit 5.

The reading head portion 22 has a reading unit 4 which includes a pair of light sources 41, a CCD 43, and an optical system 44 which are supported by an internal housing 48.

The pair of light sources 41 are located at a lower outside position of the internal housing 48, and are arranged to be symmetric about a light path 47. In the preferred embodiment the light sources 41 can include LEDs, halogen lamps or semiconductor lasers etc.

The optical system 44 includes a mirror 45 and a lens or lens group 46. The mirror 45 bends the light path 47 at right angles to be incident on the lens 46. The lens 46 forms the infocus image of the data symbol 38 on the light receiving surface of the CCD 43. The optical system 44 receives light reflected by a data symbol 38 located within a front opening 31 of a light receiving box 3, and forms an in-focus image of the data symbol 38 on a light receiving surface of the CCD 43.

A transparent plate 7 is located at a lower opening of the internal housing 48 for preventing dust and other objects from entering the reading head portion 22. Further, a dispersion plate 71 is provided between the light sources 41 and the transparent plate 7 symbol reading area 36. The dispersion plate 71 has a rough surface and makes the brightness of the symbol reading area 36 uniform. Alternatively, the dispersion plate 71 may be formed on the transparent plate 7, by roughening a portion of the transparent plate 7 which is located below the light sources 41.

The CCD 43 consists of a plurality of photodiode picture elements (pixels) arranged in a matrix. Charge is accumulated at each pixel in response to the amount of light (reflected by the data symbol 38) that is incident on the corresponding photodiodes. The accumulated charge at each pixel is transmitted to the signal processing circuit at predetermined time intervals. The transferred electric charge constitutes the image signal of the image of the data symbol 38 read by the data symbol reading device 1.

In order to read the data symbol 38, the data symbol 38 must be located within a symbol reading area 36 of the data symbol reading device 1. The symbol reading area 36 is an area inherent to the data symbol reading device 1 and defines an area of a symbol reading surface 37 which can be read by the CCD 43. In the preferred embodiment, the symbol reading area 36 substantially corresponds to the front opening 31 of the light receiving box 3, or may be slightly smaller than the front opening 31.

The light receiving box 3 is configured such that when a front opening 31 thereof contacts the symbol reading surface 47, the reading unit 4 is maintained a predetermined distance from the symbol reading surface 37. This ensures that the optical path length from the data symbol 38 to the CCD 43 remains constant when reading different data symbols. Further, the light receiving box 3 surrounds the optical path 47 such that only the light reflected by the symbol reading surface 37 in the symbol reading area 36 can enter therein.

A partition plate 32 is formed inside the light receiving box 3 and is parallel to a rear wall 33 of the light receiving box 3. A printing device 9, which is controlled by the signal processing circuit 9, is positioned between the partition plate 32 and the rear wall 33 of the light receiving box 3. The printing device 9 includes a print head 91 having a printing surface 92. The print head 91 can print information such as characters, numbers, and figures on the data symbol 38 in accordance with a selected printing mode (described later).

The print head 91 may be an impact type printer of a font or non-font type, or a non-impact type printer such as a thermal printer, photosensitive printer or an inkjet printer.

The printing surface 92 is arranged to lie in a plane that is coincident with the light receiving box 3 and the symbol reading surface 37 when the front end of the light receiving box 3 abuts the symbol reading surface 37. Therefore, the print head 91 can print data near the data symbol 38 that is placed on the symbol reading surface 37.

Figure 2:
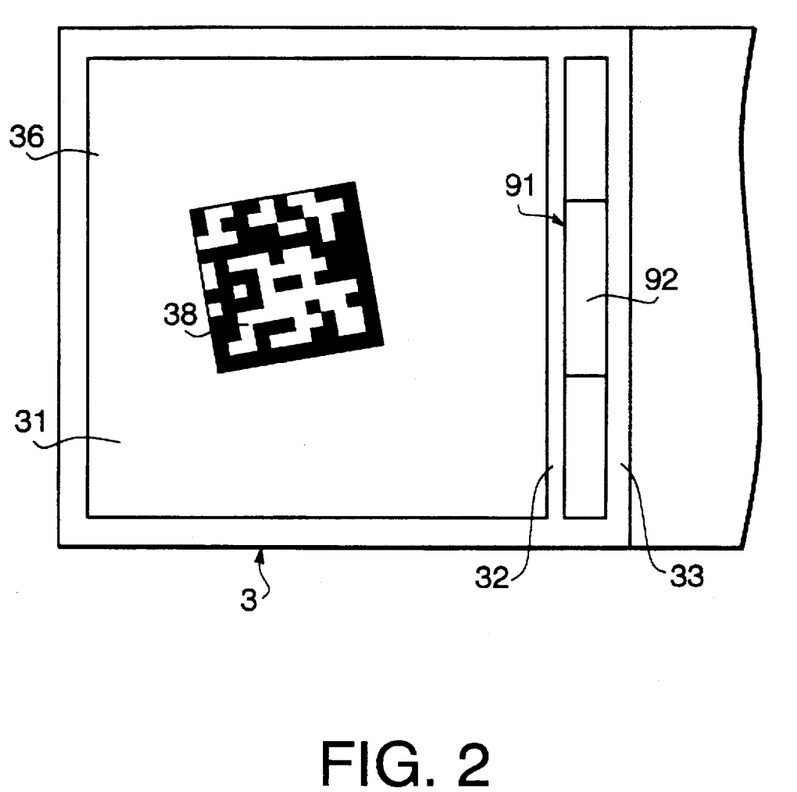
FIG. 2 shows a sectional plan view of the data symbol reading device shown in FIG. 1.

FIG. 2 shows a sectional plan view of a lower portion of the reading head portion 22. As shown in FIG. 2, the data symbol 38 is composed of a black and white matrix pattern having X rows of cells by Y columns of cells, where X and Y are integers larger than 1. The black and white cells represent binary data having values 0 or 1, respectively. Therefore, information is indicated by different combinations of the black and white cells. Alternatively, combinations of black and transparent cells can be used to indicate the data. In this case the data symbol 38 should be backlit.

In the data symbol reading device 1 as shown in FIG. 2, the symbol reading area 36 and the front opening 31 correspond to the same area. However, the symbol reading area 36 may be smaller than the front opening 31.

Figure 3:
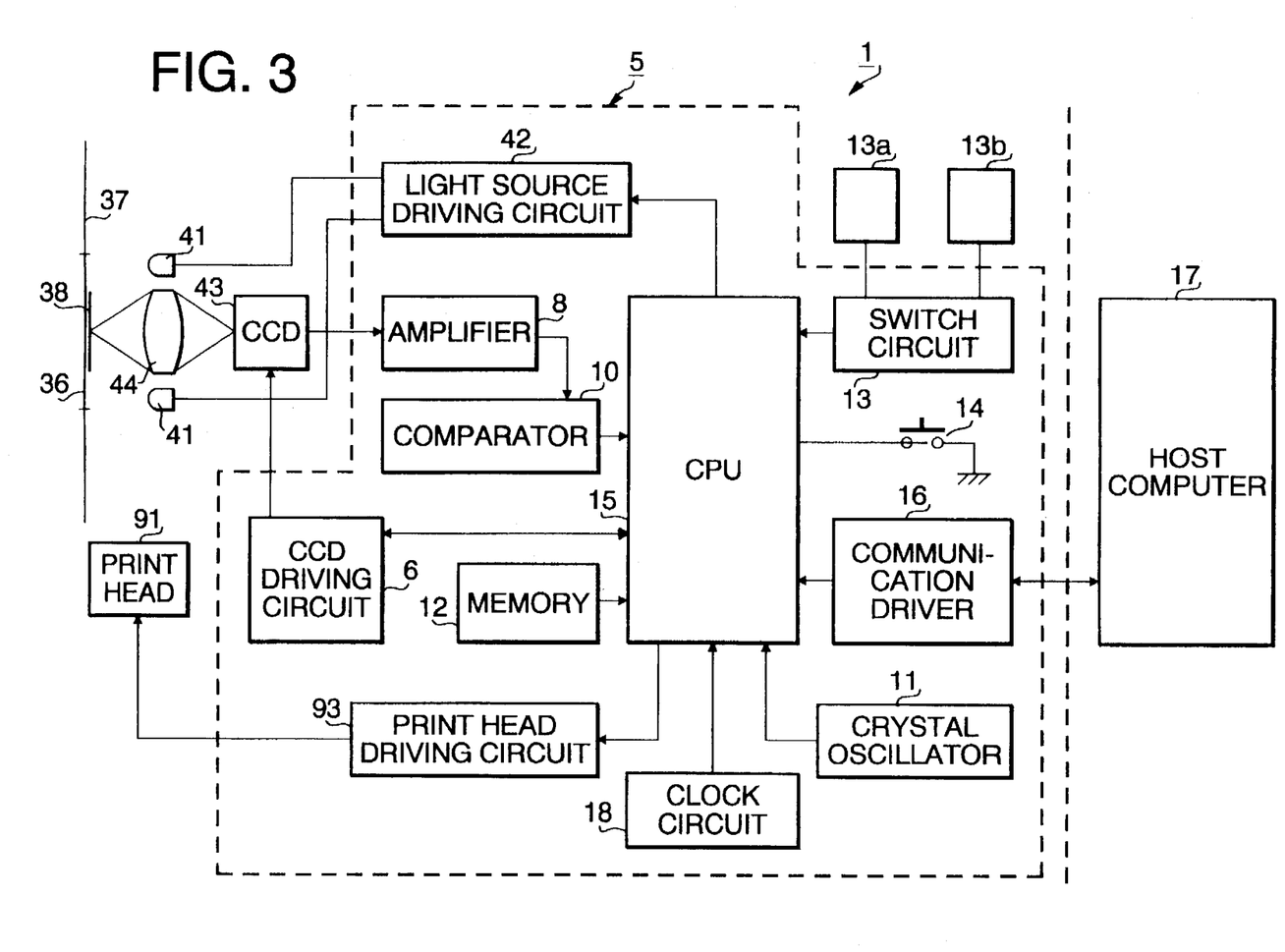
FIG. 3 shows a block diagram of the data symbol reading device shown in FIG. 1.

FIG. 3 shows a block diagram of the data symbol reading device 1. As shown in FIG. 3, the signal processing circuit 5 has a CCD driving circuit 6, an amplifying circuit 8, a comparator 10, a memory 12 and a CPU 15 mounted on a printed circuit board (not shown). Further, the data symbol reading device 1 includes a crystal oscillator 11, a switch circuit 13, a print mode selection switch 14, a communication driver 16, a light source driving circuit 42 and a print head driving circuit 93.

The operation of the data symbol reading device 1 for reading the data symbol 34 will be described with reference to FIGS. 1 and 3.

Initially, a power switch 13a is turned ON, in order to supply power to the data symbol reading device 1 from an external power supply (not shown). When the power switch 13a is turned ON, the CPU 15 applies power to the remaining circuitry of the data symbol reading device 1. In the preferred embodiment, the CPU 15 is always operating when the data symbol reading device 1 is connected to the external power supply. Further, the crystal oscillator 11 is always operating since it powered by a backup battery (not shown). Therefore, a clock circuit 18 can always maintain the current time and date.

When the data symbol 38 is to be read, an operator presses a trigger button 13b. The pressing of the trigger button is sensed by the switch circuit 13, which outputs a trigger signal to the CPU 15. The CPU 15 controls the light source driving circuit 42 to drive the light sources 41 for a predetermined time interval in order to illuminate the symbol reading area 36, in response to the received trigger signal. The CPU 15 also controls the CCD driving circuit 6 to drive the CCD 43 thereby scanning the symbol reading area 36. Thus, the CCD 43 scans the symbol reading area 36 two-dimensionally, and the accumulated charge is transferred under the control of the CCD driving circuit 6. Further, the CCD driving circuit 6 generates a compound clock signal by combining the horizontal synchronous signal and vertical synchronous signal. The compound clock signal is then output to the CPU 15.

Initially, the CCD 43 receives image data corresponding to the entire symbol reading area 36. Thus, this image data is processed using edge detection etc., in order to separate the image data corresponding to the data symbol 38 from the rest of the image data. If there is a data symbol in the symbol reading area 36, then the CCD 43 will output an analog image signal corresponding to the received data symbol image. The output analog image signal is amplified by the amplifier 8, and the amplified signal is compared with a threshold signal by the comparator 10. The comparator 10 then outputs a binary signal to the CPU 15 which stores the binary data in the memory 12 by the CPU 15 at an address determined by an address counter contained within the CPU 15. The address counter is driven by the compound clock signal, which is input from the CCD driving circuit 6. The data is then sequentially read out from the memory 12 in accordance with the addresses output from the address counter. The data may also be read out in a reverse order from the order that it was stored in the memory 12 by reversing the designated addresses.

The read out data is then processed frame by frame by the calculating portion of the CPU 15. The CPU 15 can perform image inversion, drop correction and image rotation. The CPU 15 also decodes the data and outputs the decoded data to a host computer or work station 17 via the communication driver 16.

After the data has been decoded, the CPU 15 controls the printing device 9 via the print head driving circuit 93, to print a predetermined symbol on a product to which the data symbol 38 is affixed, in accordance with one of five printing modes selected by the print mode selection switch 14. The five printing modes are shown in Table 1 below:

TABLE 1

| PRINT MODE | CODE PRINTED | |
|---|---|---|
| | COMPLETION OF PROPER READING | READING ERROR |
| FIRST MODE | O | X |
| SECOND MODE | O | (NO PRINT) |
| THIRD MODE | TIME (EG. 10:39) | X |
| FOURTH MODE | TIME (EG. 10:39) | (NO PRINT) |
| FIFTH MODE | (NO PRINT) | (NO PRINT) |

As shown in Table 1 above, for the first through fourth print modes, the print head 91 prints a code 99 near the data symbol 38 in accordance with whether the data symbol 38 has been correctly decoded. In the fifth print mode the code 99 is not printed on the data symbol 38. The code 99 can be any alphanumeric character or the time at which the data symbol 38 is read.

More specifically, in the first and second print modes the code 99 represented as an O is printed near the data symbol 38, if the data symbol 38 has been properly read. In the third and fourth print modes the code 99 represented as the time at which the data symbol is read, is printed near the data symbol 38 if the data symbol 38 has been correctly decoded.

Conversely, in the first and third print mode, the code 99 represented as an × is printed near the data symbol 38, if the data symbol 38 has not been correctly decoded. However, in the second and fourth modes the code 99 is not printed near the data symbol 38 in the case that the data symbol 38 is not correctly decoded.

Figure 4:
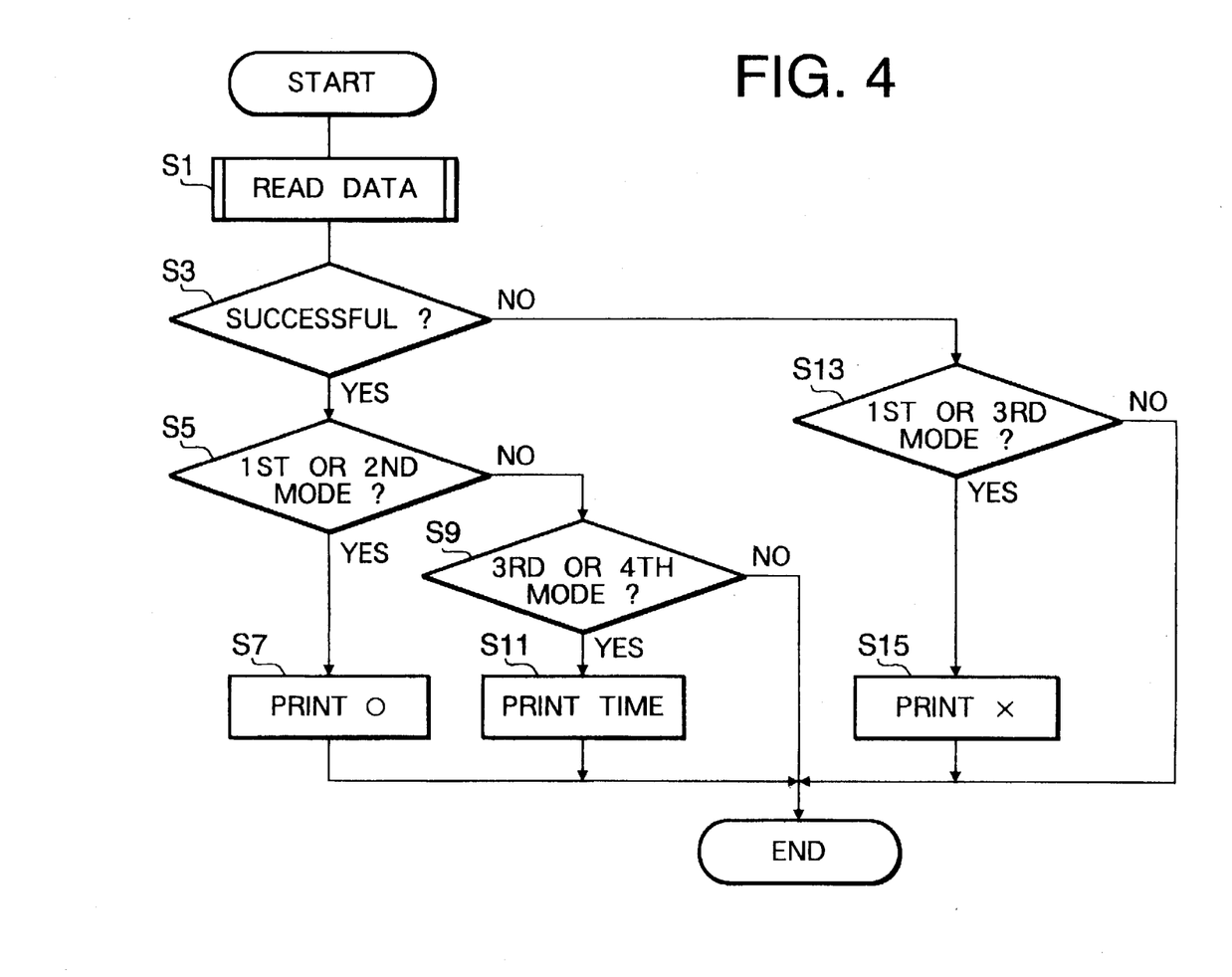
FIG. 4 shows a flowchart of an operation of the data symbol reading device shown in FIG. 1.

FIG. 4 shows a flowchart of a main operation of the data symbol reading device 1, in which the data symbol 38 is read and the code 99 is printed in accordance with the mode of operation.

Initially, in step S1, the data symbol 38 is read and decoded, as described above.

Then in step S3, the CPU 15 determines whether the data symbol 38 was correctly decoded. A description of the decoding process is given in U.S. patent application Ser. No. 08/404,996 which is incorporated herein by reference in its entirety.

If the data symbol 38 is correctly decoded (S3:Y), the CPU 15 determines if the first or second mode has been selected by the print mode selection switch 14 in step S5. If the first or second mode has been selected (S5:Y), then the CPU 15 controls the print unit 9 to print an O near the data symbol 38, in step S7.

However, if the first or second mode was not selected (S5:N), then the CPU 15 determines if the third or fourth mode has been selected in step S9. If the third or fourth mode has been selected (S9:Y), then the CPU 15 controls the print unit 9 to print the time when the symbol was read, near the data symbol 38. Otherwise (S9:N), nothing is printed, and the operation ends.

If the data symbol was not properly read in step S3, then the CPU 15 determines if the first or third mode has been selected in step S13. If the first or third mode has been selected (S13:Y), then the CPU 15 controls the print unit 9 to print an × near the data symbol 38, in step S15. Otherwise (S13:N), nothing is printed, and the operation ends.

Figure 5:
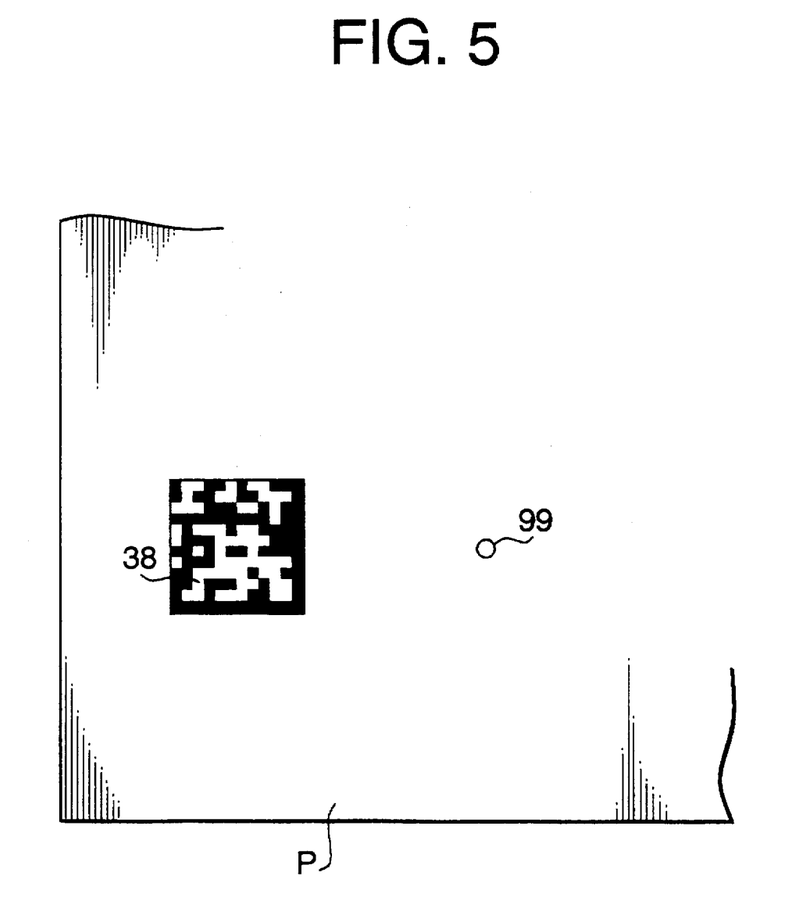
FIG. 5 shows an example of an symbol formed on a product by the data symbol reading device shown in FIG. 1.

An example of the printing of the code 99 on a product P which has a data symbol 38 to be read, is shown in FIG. 5.

By pressing the print mode selection switch 14, the print mode can be cycled through the first through fifth print modes.

Thus, after the CPU 15 decodes the data, the CPU 15 controls the printing device 32 to print one of the symbols shown in Table 1, in response to the determination that the data symbol 38 was correctly decoded. Further, in the first and third modes, the printing device 9 prints a symbol or group of symbols (i.e., an O or the time) near the data symbol 38, when the data symbol 38 is correctly decoded. Furthermore, the printing device 9 also prints another symbol (i.e., an ×) near the data symbol 38, when the data symbol 38 is not correctly decoded.

As described above, the data symbol reading device which embodies the present invention can print a predetermined code on a symbol reading surface near a data symbol affixed on a product in response to the reading of the data symbol. This is accomplished by providing the data symbol reading device with a printing device in order to print symbols indicating that the data symbol has or has not been properly read. Therefore, it is easy for an operator of the data symbol reading device to recognize which data symbols have been read correctly, which ones have not been read correctly, and which ones have not been read at all.

Further, five different print modes are provided, and therefore, the operator can choose whether a good/no good symbol is printed on the data symbol, or whether the time of reading the data symbol should be printed on the data symbol. Furthermore, any combination of these symbols may be printed depending on the result of reading the data symbol and the print mode that is selected. This improves the utility of the data symbol reading device and increases the efficiency at which data symbols of products can be processed at a point of sale terminal.

The present invention is not limited to the embodiment described above. In the data symbol reading device described above, the data to be printed on the symbol reading surface near the data symbol is set manually in accordance with one of the five different printing modes. However, the data can be downloaded from an external computer through an interface.

The present disclosure relates to subject matter contained in Japanese Patent Application No. HEI 7-144117 filed on May 17, 1995 which is expressly incorporated herein by reference in its entirety.

What is claimed is:

1. A data symbol reading device including a reading head, said reading head forming an opening, said opening contacting a symbol reading surface on which a data symbol is positioned, said data symbol reading device comprising:

an optical system forming an image of said data symbol;

imaging means for outputting an image signal corresponding to said image formed by said optical system;

decoding means for decoding said image signal, said decoding means outputting said decoded image signal to a determining means for determining if said data symbol has been correctly decoded; printing means capable of printing a plurality of predetermined codes on said symbol reading surface proximate to said data symbol in response to said determining means determining that said data has been correctly decoded; and a print mode selection system which selects one of a plurality of printing modes such that the printing means prints none or at least one of the predetermined codes in response to the printing mode selected by the print mode selection system:

said plurality of printing modes including a first mode in which the printing means prints a first predetermined code in response to the determining means determining that the data symbol is read properly, and the printing means prints a second predetermined code in response to the determining means determining that the data symbol is not read properly:

a second mode in which the printing means prints the first predetermined code in response to the determining means determining that the data symbol is read properly, and the printing means prints nothing in response to the determining means determining that the data symbol is not read properly:

a third mode in which the printing means prints a time when the data symbol was read in response to the determining means determining that the data symbol is read properly and the printing means prints the second predetermined code in response to the determining means determining that the data symbol is not read properly; and a fourth mode in which the printing means prints the time when the data symbol was read in response to the determining means determining that the data symbol is read properly, and the printing means prints nothing in response to the determining means determining that the data symbol is not read properly.

2. The data symbol reading device according to claim 1, wherein said printing means is provided proximate to said opening of said reading head.

3. The data symbol reading device according to claim 1, wherein said printing means comprises a print head and said predetermined code includes character data and numerical data, wherein a printing surface of said print head contacts said symbol reading surface when said opening contacts said symbol reading surface.

4. The data symbol reading device according to claim 3, wherein said print means further comprises a print control means for controlling a driving of said print head when that said symbol is properly read.

5. The data symbol reading device according to claim 1, wherein said reading head is substantially L-shaped, and wherein said data symbol reading device further comprises a handle, said handle attached to said reading head at one end thereof, wherein said opening is formed at another end of said reading head.

6. The data symbol reading device according to claim 1, wherein said data symbol is a binary symbol.

7. A data symbol reading device comprising:

means for illuminating a data symbol;

means for forming an image of said illuminated data symbol;

means for detecting said image of said illuminated data symbol;

means for decoding said detected image of said illuminated data symbol, said decoding means outputting decode data;

means for determining that said data symbol has been correctly decoded; means capable of printing a plurality of predetermined codes proximate to said data symbol in response to said determining means determining that said data symbol has been correctly decoded; and a print mode selection system which selects one of a plurality of printing modes such that the printing means prints none or at least one of the predetermined codes in response to the printing mode selected by the print mode selection system;

said plurality of printing modes including a first mode in which the printing means prints a first predetermined code in response to the determining means determining that the data symbol is read properly and the printing means prints a second predetermined code in response to the determining means determining that the data symbol is not read properly:

a second mode in which the printing means prints the first predetermined code in response to the determining means determining that the data symbol is read properly, and the printing means prints nothing in response to the determining means determining that the data symbol is not read properly;

a third mode in which the printing means prints a time when the data symbol was read in response to the determining means determining that the data symbol is read properly and the printing means prints the second predetermined code in response to the determining means determining that the data symbol is not read properly; and a fourth mode in which the printing means prints the time when the data symbol was read in response to the determining means determining that the data symbol is read properly and the printing means prints nothing in response to the determining means determining that the data symbol is not read properly.

8. The data symbol reading device according to claim 7, wherein said printing means comprises a print head, and wherein said first and second predetermined codes includes character data and numerical data.

9. The data symbol reading device according to claim 8, wherein said first predetermined code and said second predetermined code are different characters.

10. A data symbol reading device comprising:

means for reading a data symbol affixed to a symbol reading surface of a product;

means capable of printing at least one predetermined code on said symbol reading surface near said data symbol in response to said reading means reading said data symbol;

means for decoding said data symbol read by said reading means;

means for determining whether said data symbol is decoded correctly; and a print mode selection system which selects one of a plurality of printing modes such that the printing means prints none or at least one of the predetermined codes in response to the printing mode selected by the print mode selection system:

said plurality of printing modes including a first mode in which the printing means prints a first predetermined code in response to the determining means determining that the data symbol is read properly, and the printing means prints a second predetermined code in response to the determining means determining that the data symbol is not read properly;

a second mode in which the printing means prints the first predetermined code in response to the determining means determining that the data symbol is read properly, and the printing means prints nothing in response to the determining means determining that the data symbol is not read properly;

a third mode in which the printing means prints a time when the data symbol was read in response to the determining means determining that the data symbol is read properly, and the printing means prints the second predetermined code in response to the determining means determining that the data symbol is not read properly; and a fourth mode in which the printing means prints the time when the data symbol was read in response to the determining means determining that the data symbol is read properly, and the printing means prints nothing in response to the determining means determining that the data symbol is not read properly.

11. The data symbol reading device according to claim 10, said reading means comprising a light receiving box, said light receiving box having an outside surface which contacts said symbol reading surface when said reading means reads and data symbol, said printing means having a printing surface which lies on a plane which is coincident with a plane of said outside surface of said light receiving box.

12. The data symbol reading device according to claim 1 in which the plurality of printing modes further includes a fifth mode in which said printing means prints nothing whether or not the data symbol is properly read or is not properly read.

13. The data symbol reading device according to claim 7 in which the plurality of printing modes further includes a fifth mode in which printing is not executed whether or not the data symbol is properly read or is not properly read.

14. The data symbol reading device according to claim 10 in which the plurality of printing modes further includes a fifth mode in which printing is not executed whether or not the data symbol is properly read or is not properly read.

* * * * *

UNITED STATES PATENT AND TRADEMARK OFFICE
CERTIFICATE OF CORRECTION

PATENT NO. : 5,747,787
DATED : May 5, 1998
INVENTOR(S) : T. Shin, et. al.

It is certified that error appears in the above-indentified patent and that said Letters Patent is hereby corrected as shown below:

Title page, item [73], Assignee: change "Asashi" to -- Asahi --.

Signed and Sealed this

Twenty-fifth Day of August, 1998

Attest:

BRUCE LEHMAN

Attesting Officer

Commissioner of Patents and Trademarks